United States Patent [19]

Sugimoto

[11] Patent Number: 5,784,647
[45] Date of Patent: Jul. 21, 1998

[54] INTERFACE FOR FETCHING HIGHEST PRIORITY DEMAND FROM PRIORITY QUEUE, PREDICTING COMPLETION WITHIN TIME LIMITATION THEN ISSUING DEMAND, ELSE ADDING DEMAND TO PENDING QUEUE OR CANCELING

[75] Inventor: Kinichi Sugimoto, Tokyo, Japan

[73] Assignee: NEC Corporation, Tokyo, Japan

[21] Appl. No.: 575,119

[22] Filed: Dec. 19, 1995

[30] Foreign Application Priority Data

Dec. 19, 1994 [JP] Japan ..................... 6-315242

[51] Int. Cl.$^6$ ........................... G06F 13/18
[52] U.S. Cl. ............... 395/859; 364/238.3; 395/673; 395/438; 395/826; 395/860
[58] Field of Search ................... 364/238.3, 239; 395/438, 673, 826, 859, 860

[56] References Cited

PUBLICATIONS

Tobagi, F., et al., "Streaming RAID™—A Disk Array Management System for Video Files", *First ACM International Conference on Multimedia*, Aug. 6, 1993, Anaheim, CA, pp. 1–8.

*American National Standard X3.131–1986*, pp. 25, 26, and 194–199.

Primary Examiner—Thomas C. Lee
Assistant Examiner—Anderson I. Chen
Attorney, Agent, or Firm—Young & Thompson

[57] ABSTRACT

The present invention provides an input-output interface connected via an input-output bus to a host computer and connected with at least one memory device. The input-output interface includes a bus interface control section, an input-output control section and an additional feature for determining tie order of input-output operations not only in accordance with informations externally received about the time limitation thereof or informations externally received about until when the data processing should be completed but also in accordance with priorities determined by itself with reference to the above information so as to obtain the input-output operations within the time limitation.

14 Claims, 8 Drawing Sheets

INTERFACE FOR FETCHING HIGHEST PRIORITY DEMAND FROM PRIORITY QUEUE, PREDICTING COMPLETION WITHIN TIME LIMITATION THEN ISSUING DEMAND, ELSE ADDING DEMAND TO PENDING QUEUE OR CANCELING

BACKGROUND OF THE INVENTION

The present invention relates to an input-output interface for computer memory device, and more particularly to an input-output interface being capable for controlling input-output rates of data into and from computer memory.

Figure 1:
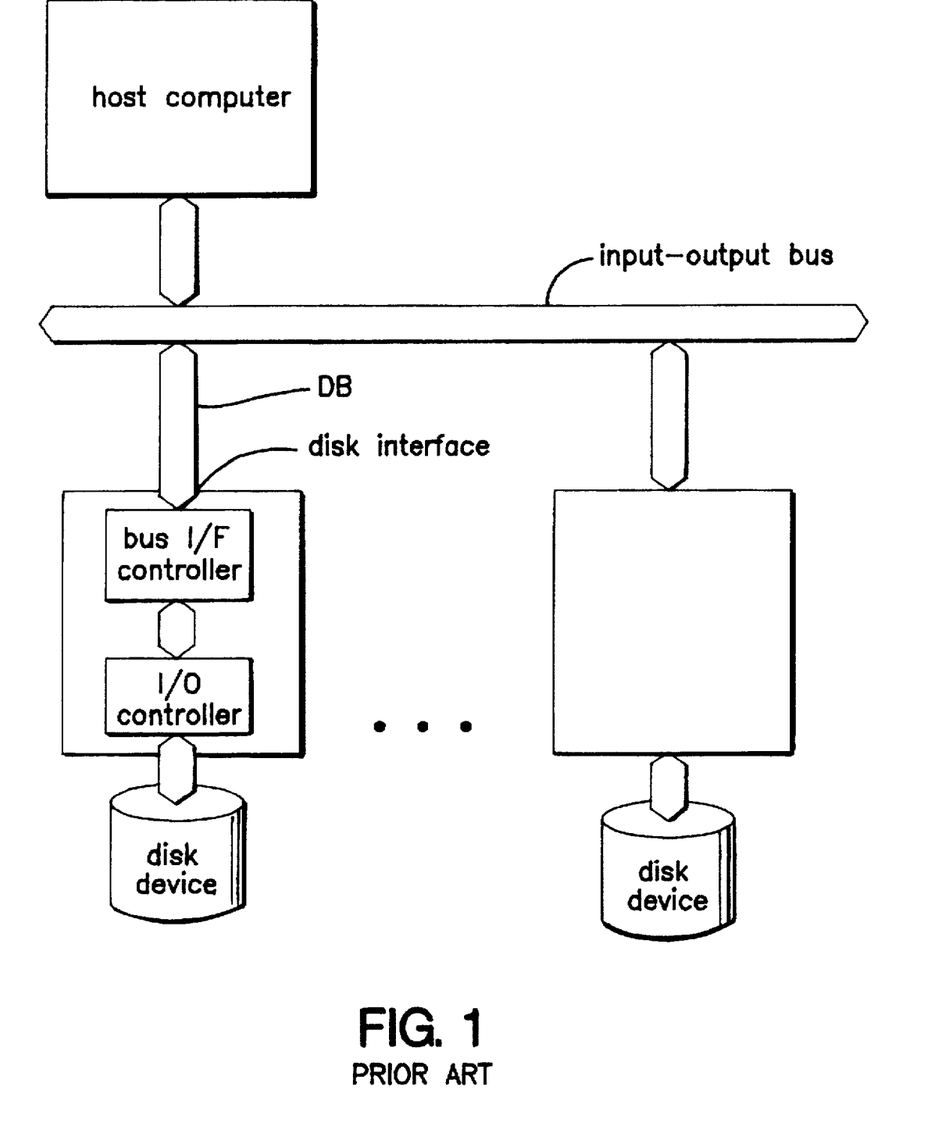
FIG. 1 is a diagram illustrative of the conventional configuration of an input-output interface.

As the processing performance of computer system has now been on the improvement, the requirement for sequential input-output of video data and audio data at a constant rate has also been on the increase. To comply with this requirement, a simple protocol controller disclosed in for example ANSI X3/131-1986 "Small Computer System Interface" has been used for controlling of the input-output of data. The conventional system is illustrated in FIG. 1, in which a software such as operating system controls not only hardware resources but also peripheral devices. Disk input-output processing is carried out as follows. A plurality of input-output demands are received in queues and then sorted as required before sequential processing.

For the conventional control system of the input-output control, it is hard to control the processing according to time-restriction information, for example, informations about until when individual processes should be made. In the prior art, the control of the processing according to the time-restriction information was carried out by software which executes an interruption processing via CPU. A plurality of disk devices are often coupled to a single host computer. In such case, input-output demands for a specific disk device are frequently generated while input-output demands for the remaining disk devices are little generated. As a result, the specific disk device only are subjected to sequential and efficient input-output operations, while the remaining disk devices are often not in use. Whereas totally the input-output operations are carried out almost sequentially, in view of individual disk devices, the input-output operations for the remaining disk devices are discontinuously performed. This may render it hard to achieve the input-output processing for the remaining disk devices within a predetermined time limit, thereby resulting in difficulty to obtain the required exact and sequential play back of the video data or the audio data.

In the prior art, interfaces for peripheral devices such as disk devices are designed so that the individual peripheral devices are controlled in transaction units. In this case, the input-output operations are performed in the order free from a degree of the emergency or the priorities. For this reason, it is necessary to prepare by software a time schedule so that input-output operations for the individual peripheral devices including memories are performed in accordance with the time schedule prepared by software. In this case, however, it is in fact difficult to realize that each of the memory devices is subjected to the required sequential input-output operations at a constant rate since the work load onto the CPU tends to be extremely large.

SUMMARY OF THE INVENTION

Accordingly, it is an object of the present invention to provide a novel input-output interface for computer memory devices, which is free from the problems and disadvantages as described above.

It is a further object of the present invention to provide a novel input-output interface for computer memory devices, which allows that each of the memory devices performs the required sequential input-output operations at a constant rate, without relying upon software time scheduling.

It is still a further object of the present invention to provide a novel input-output interface for computer memory devices, which allows that each of the memory devices performs the required efficient input-output operations, without relying upon software time scheduling.

It is still a further object of the present invention to provide a novel input-output interface for computer memory devices, which allows input-output processing in time limitation externally required.

It is another object of the present invention to provide a novel method for controlling an input-output interface for computer memory devices, which is free from the problems and disadvantages as described above.

It is a further object of the present invention to provide a novel method for controlling an input-output interface for computer memory devices, to allow that each of the memory devices performs the required sequential input-output operations at a constant rate, without relying upon software time scheduling.

It is still a further object of the present invention to provide a novel method for controlling an input-output interface for computer memory devices, to allow that each of the memory devices performs the required efficient input-output operations, without relying upon software time scheduling.

It is still a further object of the present invention to provide a novel method for controlling an input-output interface for computer memory devices, to allow input-output processing in time limitation externally required.

The above and other objects, features and advantages of the present invention will be apparent from the following descriptions.

The present invention provides an input-output interface being connected via an input-output bus to a host computer and also connected via a data bus to at least a memory device, in addition connected to a reference clock generator. The input-output interface comprises a bus interface controller being coupled via the input-output bus to the host computer for receiving an input-output demand, at least an input-output controller being coupled to the bus interface controller and coupled to the memory device, and an input-output processing rate controller being coupled to the bus interface controller for receiving the input-output demand. The input-output processing rate controller is coupled to the reference clock generator for receiving reference clock informations. The input-output processing rate controller is also coupled to the input-output controller. The input-output processing rate controller has a queue management section which includes the following four types of queues. The first is an input-output demand storing queue for storing an input-output demand. The second is a priority queue for storing a priority of the input-output demand. The third is a pending queue for storing a pending input-output demand. The fourth is an input-output execution queue for receiving an input-output execution instruction which is effective to the input-output controller. The queue management section has an extending queue for storing a time limitation information about until when an input-output operation associated with an input-output demand should be completed and a pending flag indicating whether there is any pending input-output demand stored in the pending queue.

The input-output processing rate controller confirms whether there is any demand in the priority queue. If there is any demand in the priority queue, then the input-output processing rate controller fetches a demand with the highest priority and subsequently predict with reference to the reference clock information whether it is possible to complete an input-output processing associated with the demand fetched within a time limitation set by a host computer and stored in the extending queue. If it is possible to complete the input-output processing within the time limitation, then the input-output processing rate controller issues an input-output processing execution instruction to the input-output controller so that the input-output controller executes the input-output processing associated with the demand with the highest priority. If it is impossible to complete the input-output processing within the time limitation, then the input-output processing rate controller add this demand to the pending queue or cancel this demand. If there is no demand in the priority queue, then the input-output processing rate controller confirms whether there is any demand in the pending queue. If there is any demand in the pending queue, then the input-output processing rate controller issues an input-output processing execution instruction to the input-output controller so that the input-output controller executes the input-output processing associated with the pending demand.

The present invention also provides another input-output interface being connected via an input-output bus to a host computer and also connected via a data bus to at least a memory device, in addition connected to a reference clock generator. The input-output interface comprises a bus interface controller being coupled via the input-output bus to the host computer for receiving an input-output demand, at least an input-output controller being coupled to the bus interface controller and coupled to the memory device, and an input-output processing rate controller comprising a schedule section and a queue management. The schedule section is coupled to the bus interface controller for fetching the input-output demand and also coupled to the reference clock signal generator. The queue management section is coupled to the bus interface controller for receiving the input-output demand and also coupled to the input-output controller. The queue management section includes the following four types of queues. The first is an input-output demand storing queue for storing an input-output demand. The second is a priority queue for storing a priority of the input-output demand. The third is a pending queue for storing a pending input-output demand. The fourth is an input-output execution queue for receiving an input-output execution instruction which is effective to the input-output controller. The queue management section has an extending queue for storing a time limitation information about until when an input-output operation associated with an input-output demand should be completed and a pending flag indicating whether there is any pending input-output demand stored in the pending queue.

The schedule section confirms whether there is any demand in the priority queue. If there is any demand in the priority queue, then the schedule section fetches a demand with the highest priority and subsequently predicts with reference to the reference clock information whether it is possible to complete an input-output processing associated with the demand fetched within a time limitation set by a host computer and stored in the extending queue. If it is possible to complete the input-output processing within the time limitation, then the schedule section issues an input-output processing execution instruction to the input-output controller so that the input-output controller executes the input-output processing associated with the demand with the highest priority. If it is impossible to complete the input-output processing within the time limitation, then the queue management section adds this demand to the pending queue or cancel this demand. If there is no demand in the priority queue, then the schedule section confirms whether there is any demand in the pending queue. If there is any demand in the pending queue, then the schedule section issues an input-output processing execution instruction to the input-output controller so that the input-output controller executes the input-output processing associated with the pending demand.

The present invention also provides an input-output interface connected via an input-output bus to a host computer and connected with at least one memory device. The input-output interface includes a bus interface control section, an input-output control section and an additional feature for determining the order of input-output operations not only in accordance with informations externally received about the time limitation thereof or informations externally received about until when the data processing should be completed but also in accordance with priorities determined by itself with reference to the above information so as to obtain the input-output operations within the time limitation.

The additional feature mainly has two functions. One is to do a time scheduling and another is to maintain queues with priorities. Each queue stores a set of the following six informations. The first is a command. The second is a logical address on a memory device. The third is an buffer address on an input/output bus. The fourth is a length of transmission. The foregoing first and fourth informnations are also stored in the conventional queue. However, according to the present invention, each queue further stores the fifth information about a time limitation, for example, about until when input-output operations should be completed, and the sixth information about a pending flag.

The additional feature receives input-output demands with the time limit information from the bus interface control section and stores these demands in the queues.

BRIEF DESCRIPTIONS OF THE DRAWINGS

Preferred embodiments according to the present invention will be described in detail with reference to the accompanying drawings.

DISCLOSURE OF THE INVENTION

The present invention provides an input-output interface being connected via an input-output bus to a host computer and also connected via a data bus to at least a memory device, in addition connected to a reference clock generator. The input-output interface comprises a bus interface controller being coupled via the input-output bus to the host computer for receiving an input-output demand, at least an input-output controller being coupled to the bus interface controller and coupled to the memory device, and an input-output processing rate controller being coupled to the bus interface controller for receiving the input-output demand. The input-output processing rate controller is coupled to the reference clock generator for receiving reference clock informations. The input-output processing rate controller is also coupled to the input-output controller. The input-output processing rate controller has a queue management section which includes the following four types of queues. The first is an input-output demand storing queue for storing an input-output demand. The second is a priority queue for storing a priority of the input-output demand. The third is a pending queue for storing a pending input-output demand. The fourth is an input-output execution queue for receiving an input-output execution instruction which is effective to the input-output controller. The queue management section has an extending queue for storing a time limitation information about until when an input-output operation associated with an input-output demand should be completed and a pending flag indicating whether there is any pending input-output demand stored in the pending queue.

The input-output processing rate controller confirms whether there is any demand in the priority queue. If there is any demand in the priority queue, then the input-output processing rate controller fetches a demand with the highest priority and subsequently predict with reference to the reference clock information whether it is possible to complete an input-output processing associated with the demand fetched within a time limitation set by a host computer and stored in the extending queue. If it is possible to complete the input-output processing within the time limitation, then the input-output processing rate controller issues an input-output processing execution instruction to the input-output controller so that the input-output controller executes the input-output processing associated with the demand with the highest priority. If it is impossible to complete the input-output processing within the time limitation, then the input-output processing rate controller add this demand to the pending queue or cancel this demand. If there is no demand in the priority queue, then the input-output processing rate controller confirms whether there is any demand in the pending queue. If there is any demand in the pending queue, then the input-output processing rate controller issues an input-output processing execution instruction to the input-output controller so that the input-output controller executes the input-output processing associated with the pending demand.

It is available that the reference clock informations are counter informations to be counted up in clocks maintained by hardware and keeps the necessary data length for managing the data to be controlled and the reference clock signals are transmitted in a bus cycle corresponding to the bus width of the input-output bus.

It is also available that the reference clock generator issues a bus request signal and when the bus becomes empty then the host computer returns a bus grant signal to the bus interface controller and subsequently the bus interface controller confirms that the bus cycle is the transmission cycle of the reference clock signal when the next bus clock is risen and if it is so then the bus interface controller receives data in the subsequent bus cycle.

In this case, it is further available that during the outputs of the command and data, a status signal is outputted, which indicates the transmission cycle of the reference clock signal and a frame signal is negated to explicit that the bus cycle is terminated in the clock before the cycle for the final data, and if it is required to feed the bus cycle for feeding the reference data via a bridge to another bus then the time information is fed onto the bus after a time delay in a bridge circuit is compensated.

The interface may be connected to a plurality of the memory devices and the interface has the same number of the input-output controllers as the memory devices.

In this case, it is available that the input-output processing rate controller selects any one of the memory devices with reference to the input-output demand received to confirm the length of the input-output execution queue in the input-output interface connected to the selected memory device, and if the length of the input-output execution queue is beyond a predetermined length of the selected memory device then the input-output demand is added onto the pending queue without executing the input-output processing, and if the length of the input-output execution queue is within the predetermined length of the selected memory device then the input-output processing is performed.

It is available to further provide at least a data buffer between the bus interface controller and the input-output controllers for temporary storing data to be subjected to an input-output processing only when the input-output bus is crowded.

The present invention also provides another input-output interface being connected via an input-output bus to a host computer and also connected via a data bus to at least a memory device, in addition connected to a reference clock generator. The input-output interface comprises a bus interface controller being coupled via the input-output bus to the host computer for receiving an input-output demand, at least an input-output controller being coupled to the bus interface controller and coupled to the memory device, and an input-output processing rate controller comprising a schedule section and a queue management. The schedule section is coupled to the bus interface controller for fetching the input-output demand and also coupled to the reference clock signal generator. The queue management section is coupled to the bus interface controller for receiving the input output demand and also coupled to the input-output controller. The queue management section includes the following four types of queues. The first is an input-output demand storing queue for storing an input-output demand. The second is a priority queue for storing a priority of the input-output demand. The third is a pending queue for storing a pending input-output demand. The fourth is an input-output execution queue for receiving an input-output execution instruction which is effective to the input-output controller. The queue management section has an extending queue for storing a time limitation information about until when an input-output operation associated with an input-output demand should be completed and a pending flag indicating whether there is any pending input-output demand stored in the pending queue.

The schedule section confirms whether there is any demand in the priority queue. If there is any demand in the priority queue, then the schedule section fetches a demand with the highest priority and subsequently predicts with reference to the reference clock information whether it is possible to complete an input-output processing associated with the demand fetched within a time limitation set by a host computer and stored in the extending queue. If it is possible to complete the input-output processing within the time limitation, then the schedule section issues an input-output processing execution instruction to the input-output controller so that the input-output controller executes the input-output processing associated with the demand with the highest priority. If it is impossible to complete the input-output processing within the time limitation, then the queue management section adds this demand to the pending queue or cancel this demand. If there is no demand in the priority queue, then the schedule section confirms whether there is any demand in the pending queue. If there is any demand in the pending queue, then the schedule section issues an input-output processing execution instruction to the input-output controller so that the input-output controller executes the input-output processing associated with the pending demand.

The present invention also provides a method for controlling an input-output interface being connected via an input-output bus to a host computer and also being connected via a data bus to at least a memory device, in addition being connected to a reference clock generator. In this method according to the present invention, it is confirmed whether there is any demand in a priority queue. If there is any demand in the priority queue, then an input-output demand with the highest priority is fetched. Subsequently, with reference to a reference clock information it is predicted whether it is possible to complete an input-output processing associated with the demand fetched within a time limitation set by a host computer and stored in the extending queue. If it is possible to complete the input-output processing within the time limitation, then the input-output processing associated with the demand with the highest priority is executed. If it is impossible to complete the input-output processing within the time limitation, then this demand is pending or canceled. If there is no demand, then it is confirmed whether there is any demand on pending. If there is any demand on pending, then an input-output processing execution instruction is issued to execute the input-output processing associated with the pending demand.

It is available that the reference clock informations are counter informations to be counted up in clocks maintained by hardware and keeps the necessary data length for managing the data to be controlled and the reference clock signals are transmitted in a bus cycle corresponding to the bus width of the input-output bus.

In this case, it is further available that a bus request signal is issued by the reference clock generator and when the bus becomes empty then the host computer returns a bus grant signal to the input-output interface and subsequently the input-output interface confirms that the bus cycle is the transmission cycle of the reference clock signal when the next bus clock is risen, and if it is so then the input-output interface receives data in the subsequent bus cycle.

In this case, it is furthermore available that during the outputs of the command and data, a status signal is outputted, which indicates the transmission cycle of the reference clock signal and a frame signal is negated to explicit that the bus cycle is terminated in the clock before the cycle for the final data, and if it is required to feed the bus cycle for feeding the reference data via a bridge to another bus then the time information is fed onto the bus after a time delay in a bridge circuit is compensated.

In this case, it is moreover available that the input-output interface selects any one of the memory devices connected to the input-output interface with reference to the input-output demand received so as to confirm the length of the input-output execution time, and if the length of the input-output execution time is beyond a predetermined time length associated with the selected memory device then the input-output demand becomes pending without executing the input-output processing, and if the length of the input-output execution time is within the predetermined time length associated with the selected memory device then the input-output processing is performed.

In this case, it is still more available that data to be subjected to an input-output processing is temporally held only when the input-output bus is crowded.

EMBODIMENTS

Figure 2:
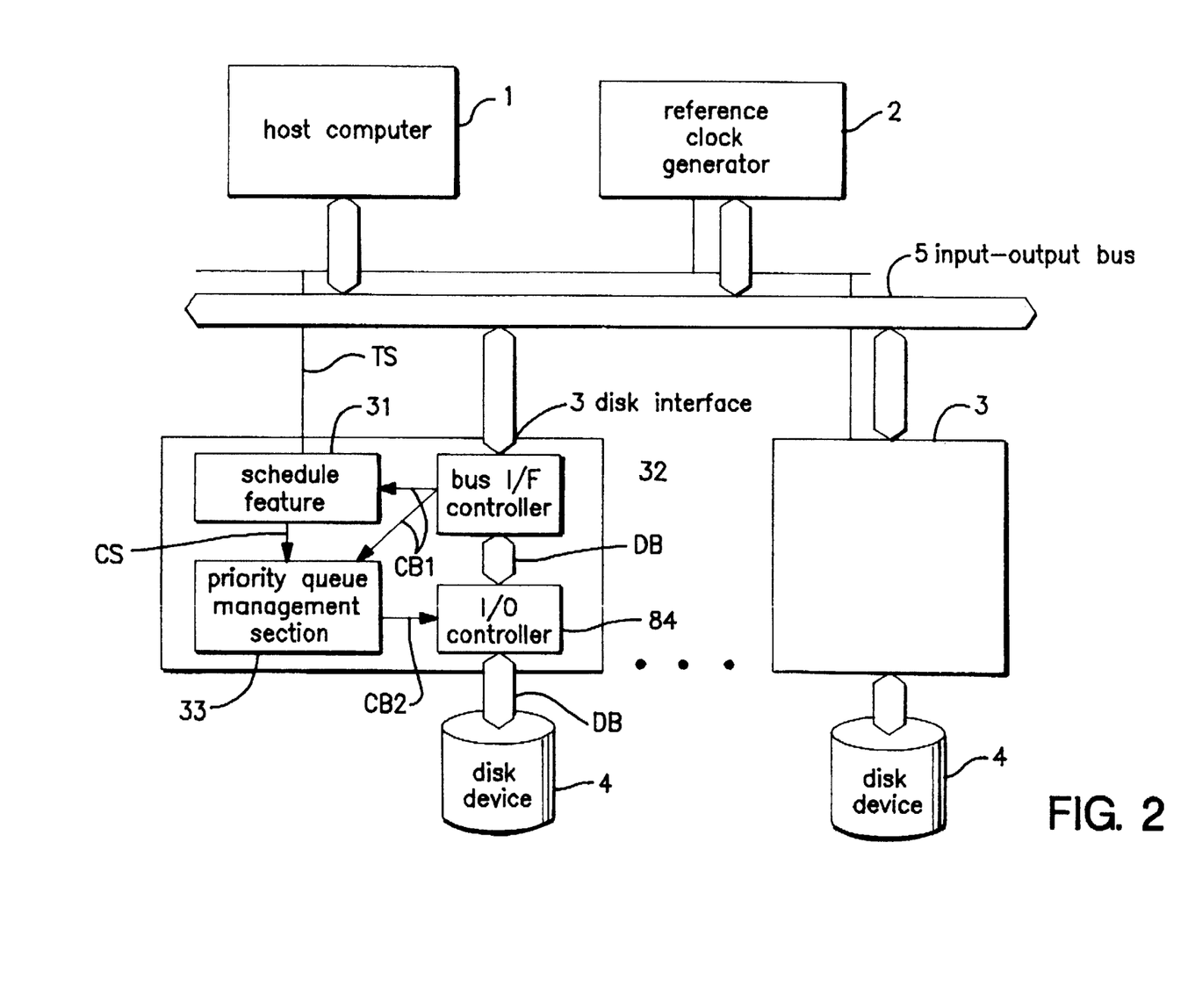
FIG. 2 is a diagram illustrative of a novel configuration of an input-output interface in first and second embodiments according to the present invention.
Figure 3A:
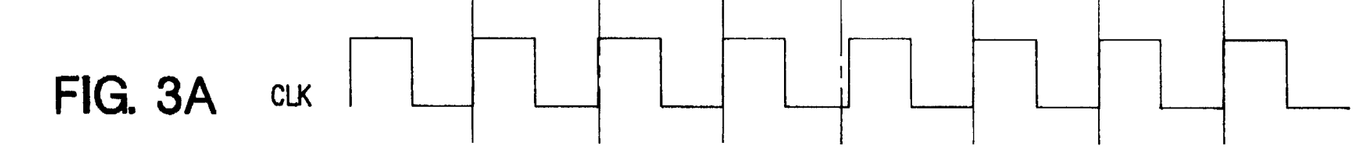
FIG. 3A-3F are timing charts of bus cycles used for an input-output interface in-first and second embodiments according to the present invention.
Figure 3B:
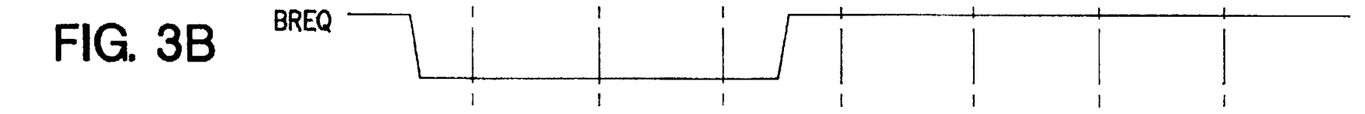
Figure 3C:
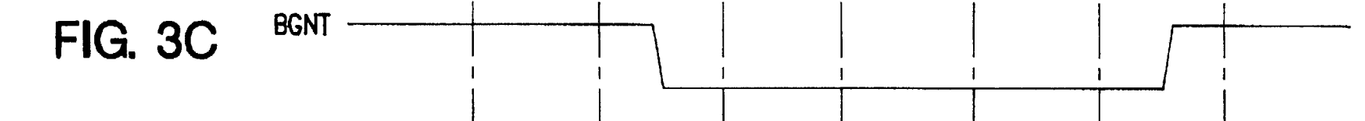
Figure 3D:
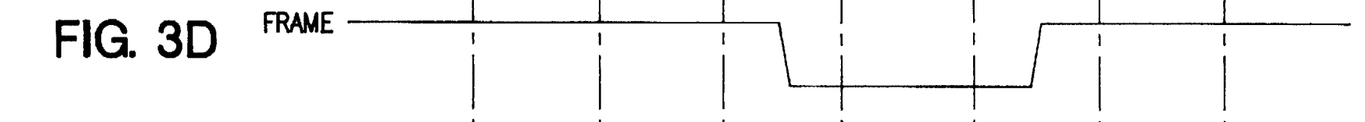
Figure 3E:
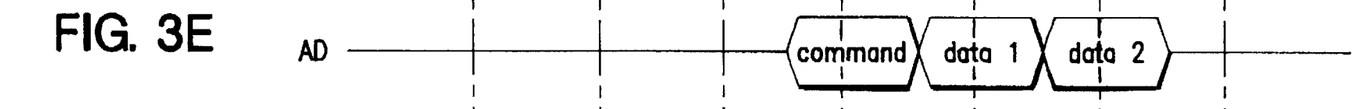
Figure 3F:
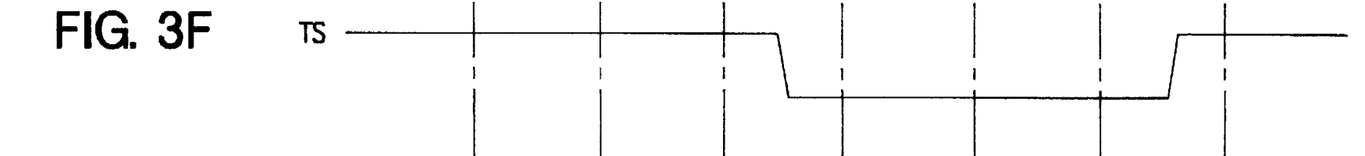

A first embodiment according to the present invention will be described. With reference to FIG. 2, a disk interface 3 serving as an input-output interface is coupled via a data bus DB to a disk device 4. The disk input-output interface 3 is further coupled via an input-output bus 5 to a host computer 1 and also to a reference clock generator 2.

The disk input-output interface 3 includes a bus interface controller 32 connected via data bus DB to the input-output bus 5. The disk input-output interface 3 also includes an input-output controller 34 coupled via data buses to both the bus interface controller 32 and the disk device 4. The disk input-output interface 3 also includes a scheduling feature 31 for determining the order of disk input-output operations. The scheduling feature 31 is connected both to the reference clock generator 2 and to the bus interface controller 32. The disk input-output interface 3 also includes a priority-accompanying queue managing section 33 coupled both to the scheduling feature 31 and the input-output controller 34.

The host computer 1 issues the input-output demand. The input-output demand issued by the host computer 1 is transmitted via the input-output bus 5 to the bus interface controller 32 of the disk input-output interface 3. The bus interface controller 32 transmits the input-output demand via a command bus CB1 to the priority-accompanying queue managing section 33. The priority-accompanying queue managing section 33 manages queues of the different four types. The first type is an input-output demand receiving queue. The second type is a priority-accompanying queue. The third type is a pending queue. The fourth type is an input-output execution queue. The input-output demand received by the bus interface controller 32 is transmitted to the priority-accompanying queue managing section 33 so that the input-output demand is stored in the input-output demand receiving queue.

On the other hand, the reference clock generator 2 generates the reference clock signal which is then transmitted via a reference clock signal transmission line TS or via the input-output bus 5 to the bus interface controller 32. The reference clock signal is then transmitted to the schedule feature 31 to be stored therein. The schedule feature 31 issues an transfer instruction to the priority-accompanying queue managing section 33 so that the input-output demand stored in the input-output demand receiving queue is transferred to the priority-accompanying queue. The schedule feature 31 issues a further transfer instruction to the priority-accompanying queue managing section 33 so that the input-output demands stored in the priority-accompanying queue and the pending queue are transmitted via the command bus 2(CB1) into the input-output controller 34. The input-output controller 34 issues an input-output instruction to the disk device 4. Data stored in the disk device 4 are transmitted via the input-output controller 34 and the bus interface controller 32 to the host computer 1.

The description will focus on how the reference clock signals are transmitted from the reference clock generator 2 to the schedule feature 31. The reference clock informations are counter informations to be counted up in clocks maintained by hardware. The reference clock information keeps the necessary data length for managing the data to be controlled. The reference clock signals are transmitted between the reference clock generator 2 and the disk interface 3 to provide the time information. The reference clock signals are transmitted in a bus cycle corresponding to the bus width of the input-output bus 5 to all disk interfaces 3.

FIG. 3A–3F are timing charts illustrative of the bus cycle which is used for the transmission of the reference clock signals. It is also available that the reference clock informations are transmitted via an exclusive bus and a serial interface. In the bus cycle illustrated in FIGS. 3A–3F, the reference clock generator 2 issues a bus request signal BREQ. When the bus becomes empty, the bus controller in the host computer 1 returns a bus grant signal BGNT. It is preferable that the reference clock generator 2 has the highest priority of the devices connected to the input-output bus 5. The disk interface controller 3 receives the bus grant signal BGNT. Subsequently, the disk interface controller 3 confirms that the bus cycle is the transmission cycle of the reference clock signal when the next bus clock CLK is risen. If it is so, the disk interface controller 3 receives data in the subsequent bus cycle.

Alternatively, it is also available to output, during the outputs of the command and data, a status TIME which indicates the transmission cycle of the reference clock signal. A FRAME signal is negated to explicit that the bus cycle is terminated in the clock before the cycle for the final data. If it is required to feed the bus cycle for feeding the reference data via a bridge to another bus, the time information is fed onto the bus after the time delay in the bridge circuit is compensated.

Figure 4:
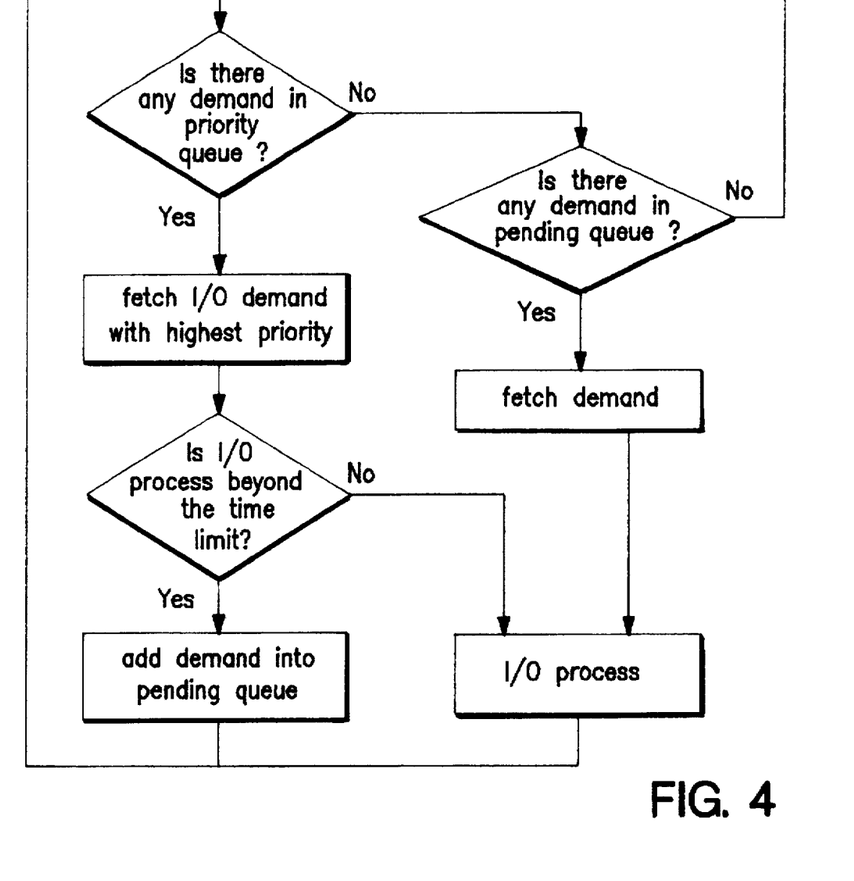
FIG. 4 is a flow chart illustrative of a method for controlling an input-output interface in a first embodiment according to the present invention.

FIG. 4 illustrates a flow chart for input-output control processes for the disk interface 3. The input-output demand from the host computer is received by the priority-accompanying queue managing section 33. The schedule feature 31 judges whether the priority-accompanying queue managing section 33 stores any input-output demand. If the priority-accompanying queue stores a plurality of the input-output demands, the schedule feature 31 compares the degrees of the priorities of the plural input-output demands so that the schedule feature 31 fetches only an input-output demand with the highest priority. On the other hand, the remaining input-output demands are stored in the pending queue in the priority-accompanying queue managing section 33. The schedule feature 31 then judges whether it is possible to complete an input-output operation associated with the fetched input-output demand within the time limit which has already received from the host computer, wherein the time limit indicates until when the input-output operations associated with the input-output demand fetched should be completed. If the schedule features 31 judges it is possible to complete the required input-output operations within the time limit, the input-output operations are performed. If, however, the schedule feature 31 judges it is impossible to complete the required input-output operations within the time limit, the input-output demand is stored in the pending queue in the priority-accompanying queue managing section 33.

If the priority-accompanying queue stores no input-output demand, the schedule feature 31 judges whether the pending queue stores any input output demand. If the pending queue stores the input-output demand, the schedule feature 31 fetches the input-output demand and subsequently the input-output operations are executed without judging whether it is possible to complete the required input-output operations within the time limit.

Figure 5:
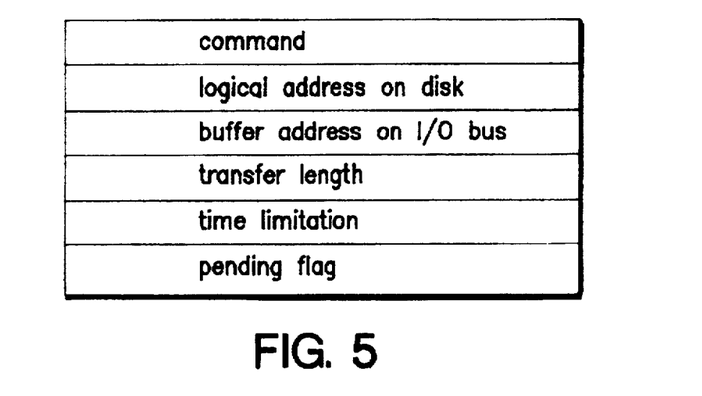
FIG. 5 is a view illustrative of a format of an input-output demand used in input-output interface according to the present invention.

FIG. 5 illustrates the format of the input-output demand transferred from the host computer 1. This input-output demand format is designed by extending the standard command format in order to set the time limitation and the pending flag. The input-output demand format includes the command, the logical address on the disk, the buffer address on the input-output address, the length of unit data to be transmitted, the time limitation and the pending flag. If the time limitation is set in the input-output demand format, then the input-output demand is accompanied with the high priority. If, however, no time limitation is set in the input-output demand format, then the input-output demand is accompanied with the low priority. If the schedule feature 31 judges it is impossible to complete the input-output operation associated with the input-output demand within the time limitation in the input-output demand format with reference to the reference clock information from the reference clock generator 2, then the input-output demand is abandoned or added onto the pending queue. It is carried out to decide, with reference to the pending flag, whether the input-output demand is added onto the pending queue. If the pending flag stands, the schedule feature 31 judges that the input-output demand should be added onto the pending queue. If the pending flag does not stand, the schedule feature 31 judges that the input-output demand should not be added onto the pending queue, and thus should be abandoned.

A second embodiment according to the present invention will be described. The input-output interface of the second embodiment is the same as that of the first embodiment except for the following processes illustrated in FIG. 6. The input-output demand from the host computer 1 is received by the input-output receiving queue of the priority-accompanying queue managing section 33 in the disk interface 3. The schedule feature 31 judges whether the priority queue of the priority-accompanying queue managing section 33 stores any input-output demand. If the priority queue of the priority-accompanying queue managing section 33 stores any input-output demand, then the schedule feature 31 receives the input-output demand. The schedule feature 31 selects a disk device with reference to the input-output demand. The schedule feature 31 then checks the length of the input-output execution queue in the input-output interface 3 corresponding to the selected disk device 4. If the length of the input-output execution queue is beyond a predetermined length of the selected disk device 4, then the input-output demand is added onto the pending queue without executing the input-output operation. If the length of the input-output execution queue is within the predetermined length of the selected disk device 4, then the input-output operation is preformed.

Figure 6:
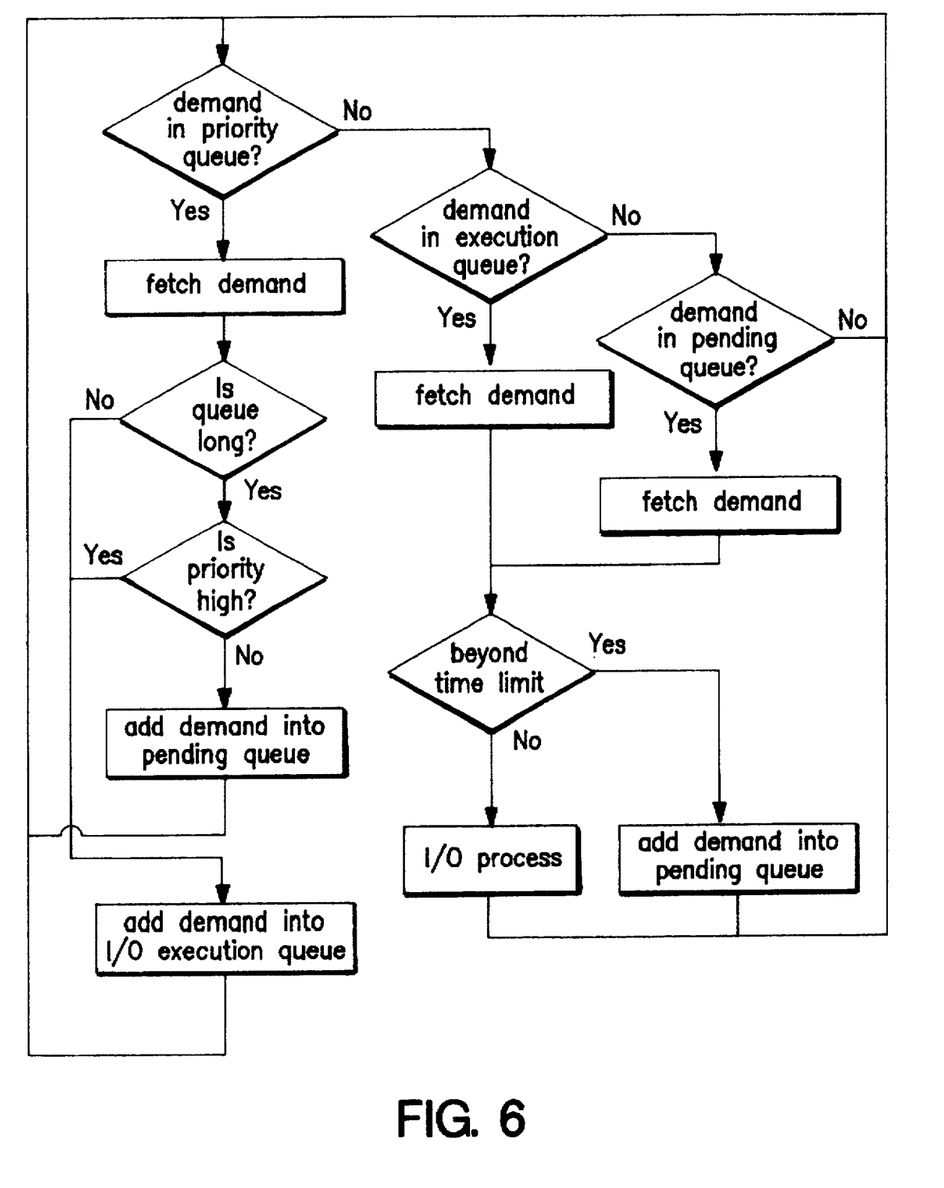
FIG. 6 is a flow chart illustrative of a method for controlling an input-output interface in a second embodiment according to the present invention.

If there is no input-output demand in the priority-accompanying queue, the schedule feature 31 judges whether there is the demand in the input-output queue. If there is any demand in the input-output queue, the schedule feature 31 judges whether it is possible to complete the input-output operation associated with the input-output demand within the time limitation. Only when the schedule feature 31 judges that it is possible to complete the input-output operation associated with the input-output demand within the time limitation, will the input-output operation be executed. If the schedule feature 31 judges that it is impossible to complete the input-output operation associated with the input-output demand within the time limitation, the input-output demand is abandoned or added onto the pending queue. If there is no demand in the input-output execution queue, the schedule feature 31 confirms whether there is the demand in the pending queue. If there is the demand in the pending queue, then the input-output operation is executed.

As illustrated in FIG. 5, the input-output demand format includes the command, the logical address on the disk, the buffer address on the input-output address, the length of unit data to be transmitted, the time limitation and the pending flag. If the time limitation is set in the input-output demand format, then the input-output demand is accompanied with the high priority. If, however, no time limitation is set in the input-output demand format, then the input-output demand is accompanied with the low priority. If the schedule feature 31 judges it is impossible to complete the input-output operation associated with the input-output demand within the time limitation in the input-output demand format with reference to the reference clock information from the reference clock generator 2, then the input-output demand is abandoned or added onto the pending queue. It is carried out to decide, with reference to the pending flag, whether the input-output demand is added onto the pending queue. If the pending flag stands, the schedule feature 31 judges that the input-output demand should be added onto the pending queue. If the pending flag does not stand, the schedule feature 31 judges that the input-output demand should not be added onto the pending queue, and thus should be abandoned.

Figure 7:
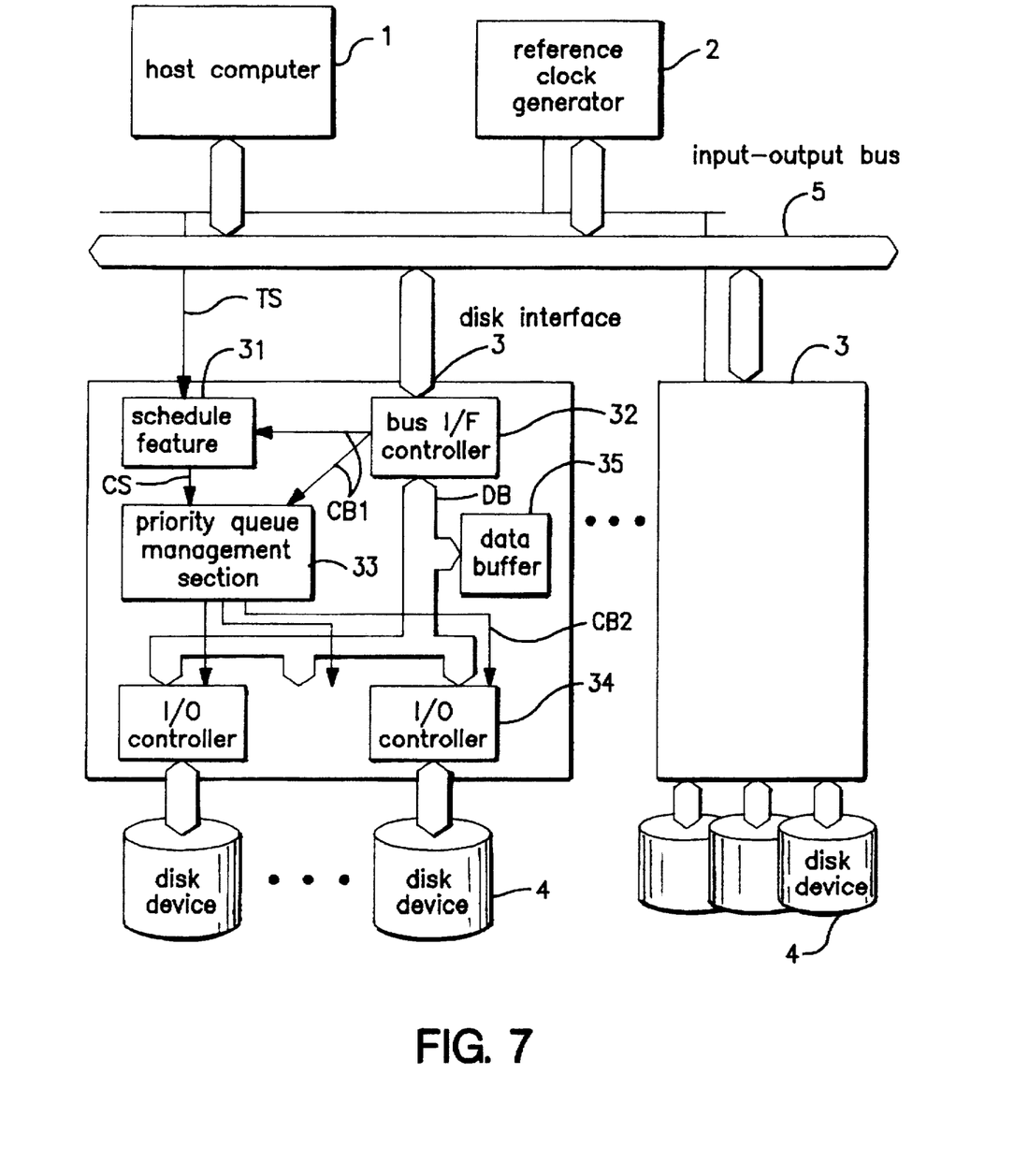
FIG. 7 is a diagram illustrative of a novel configuration of an input-output interface in a third embodiment according to the present invention.

A third embodiment according to the present invention will be described with reference to FIG. 7. A plurality of disk interfaces 3 are connected to a single host computer 1 and also connected to a reference clock signal generator 2. Each of the disk interface 3 is connected to a plurality of disk devices 4. The disk interface 3 has the same number of input-output controllers 34 as the disk devices. The disk interface 3 also has the bus interface controller 32 which is connected via the data bus DB to the plural input-output controllers 34. The data bus DB is connected to a data buffer 35. The disk interface 3 also has a scheduling feature 31. The scheduling feature 31 is connected both to the reference clock generator 2 and to the bus interface controller 32. The disk input-output interface 3 also includes a priority-accompanying queue managing section 33 coupled both to the scheduling feature 31 and the input-output controller 34.

The host computer 1 issues the input-output demand. The input-output demand issued by the host computer 1 is transmitted via the input-output bus 5 to the bus interface controller 32 of the disk input-output interface 3 coupled to the disk device selected. The bus interface controller 32 transmits the input-output demand via a command bus CB1 to the priority-accompanying queue managing section 33. The priority-accompanying queue managing section 33 manages queues of the different four types. The first type is an input-output demand receiving queue. The second type is a priority-accompanying queue. The third type is a pending queue. The fourth type is an input-output execution queue. The input-output demand received by the bus interface controller 32 is transmitted to the priority-accompanying queue managing section 33 so that the input-output demand is stored in the input-output demand receiving queue.

The schedule feature 31 selects an input-output controller 34 connected to the selected disk device 4 on the basis of the input-output demand stored in the priority-accompanying queue managing section 33. The input-output demand is transmitted via the command bus 2(CB2) to the selected input-output controller 34. Simultaneously, the schedule feature 31 issues an instruction to the selected input-output controller 34 so that the input-output operations for the selected disk device 4 is executed. The input-output controller 34 controls the disk device 4 to execute the input-output operation of data. If, however, the input-output bus 5 is crowded, it is difficult that the bus interface controller 32 receives the data. In this case, the bus interface controller 32 conduct the data transfer to the data buffer 35 and subsequently the schedule feature 31 issues an instruction to the bus interface controller 32 so as to transfer the data from the data buffer 35 into the host computer 1 after the input-output bus 5 become free from being crowded. The bus interface controller 32 received with the above instruction will fetch the data from the data buffer 35 to transmit the fetched data into the host computer 1 via the input-output bus 5. The input-output controller 34 is separately performed from the bus interface controller 32.

Figure 8:
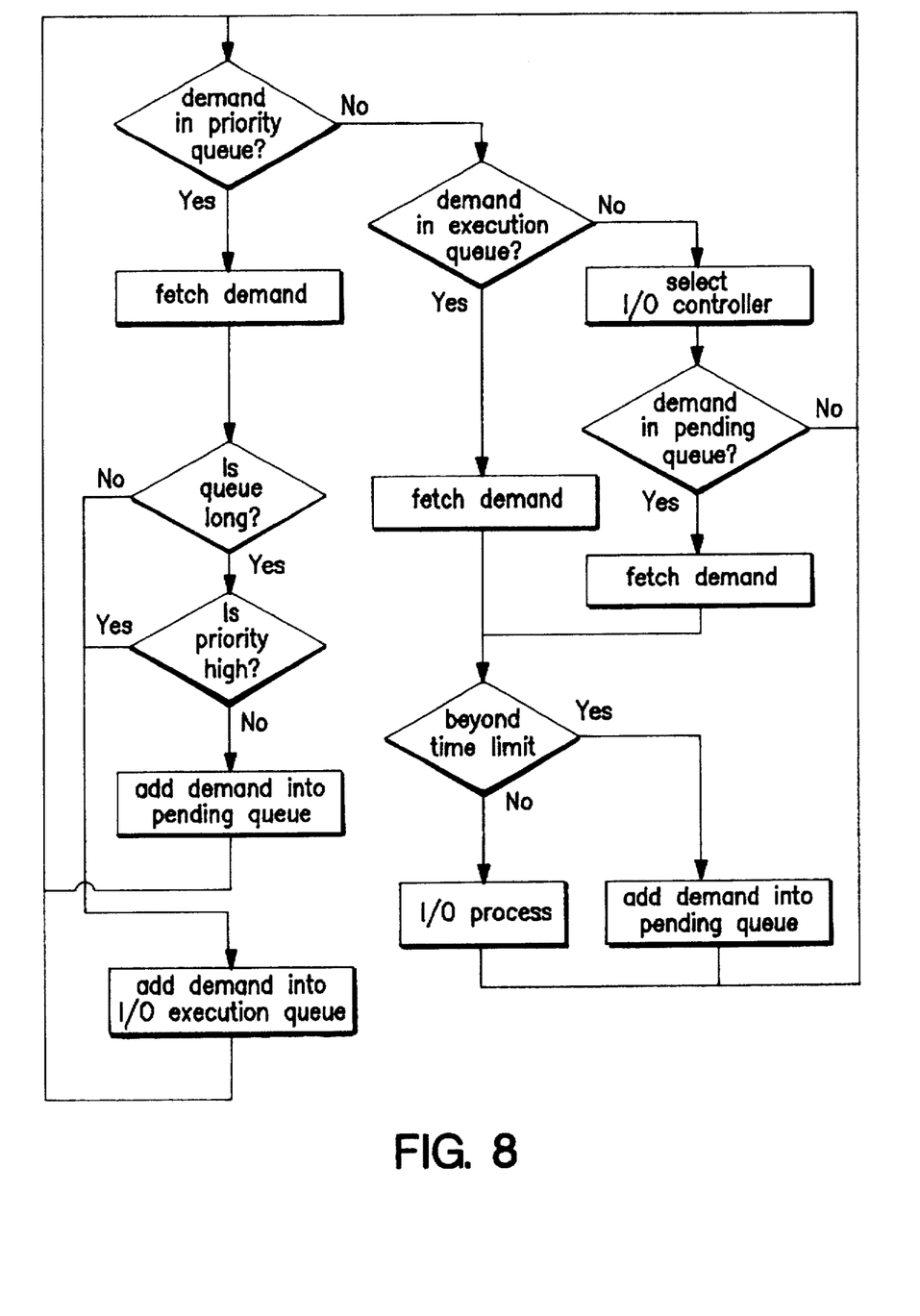
FIG. 8 is a flow chart illustrative of a method for controlling an input-output interface in a third embodiment according to the present invention.

FIG. 8 is a flow chart illustrative of the input-output control by the disk interface 3. The input-output demand from the host computer 1 is received by the priority-accompanying queue managing section 33 in the disk interface 3. The schedule feature 31 judges whether there is any demand in the priority-accompanying queue in the priority-accompanying queue managing section 33. If there is any demand in the priority-accompanying queue, then the schedule feature 31 receives the demand and then confirms the length of the input-output execution queue. If the length of the input-output execution queue is beyond a predetermined length and the input-output demand is excessive, the input-output demand is added onto the pending queue which is provided for each disk device 4. If the length of the input-output execution queue is smaller than a predetermined length and the input-output demand is not excessive, the demand is added onto the input-output execution queue. If there is no input-output demand in the priority-accompanying queue, the schedule feature 31 judges whether there is any demand in the input-output execution queue. If there is any demand in the input-output execution queue, the schedule feature 31 judges whether it is possible to complete the input-output operation within the time limitation. there is any demand in the input-output execution queue. If the schedule feature 31 judges that it is possible to complete the input-output operation within the time limitation, the input-output operations are executed. If the schedule feature 31 judges that it is impossible to complete the input-output operation within the time limitation, the input-output demand is added onto the pending queue or abandoned. If there is no demand in the input-output execution queue, the schedule feature 31 confirms whether there is any demand in the pending queue. If there is a demand in the pending queue, then the input-output operation is executed. This processes may be executed separately for individual input-output controllers 34.

As illustrated in FIG. 5, the input-output demand format includes the command, the logical address on the disk, the buffer address on the input-output address, the length of unit data to be transmitted, the time limitation and the pending flag. If the time limitation is set in the input-output demand format, then the input-output demand is accompanied with the high priority. If, however, no time limitation is set in the input-output demand format, then the input-output demand is accompanied with the low priority. If the schedule feature 31 judges it is impossible to complete the input-output operation associated with the input-output demand within the time limitation in the input-output demand format with reference to the reference clock information from the reference clock generator 2, then the input-output demand is abandoned or added onto the pending queue. It is carried out to decide, with reference to the pending flag, whether the input-output demand is added onto the pending queue. If the pending flag stands, the schedule feature 31 judges that the input-output demand should be added onto the pending queue. If the pending flag does not stand, the schedule feature 31 judges that the input-output demand should not be added onto the pending queue, and thus should be abandoned.

Figure 9:
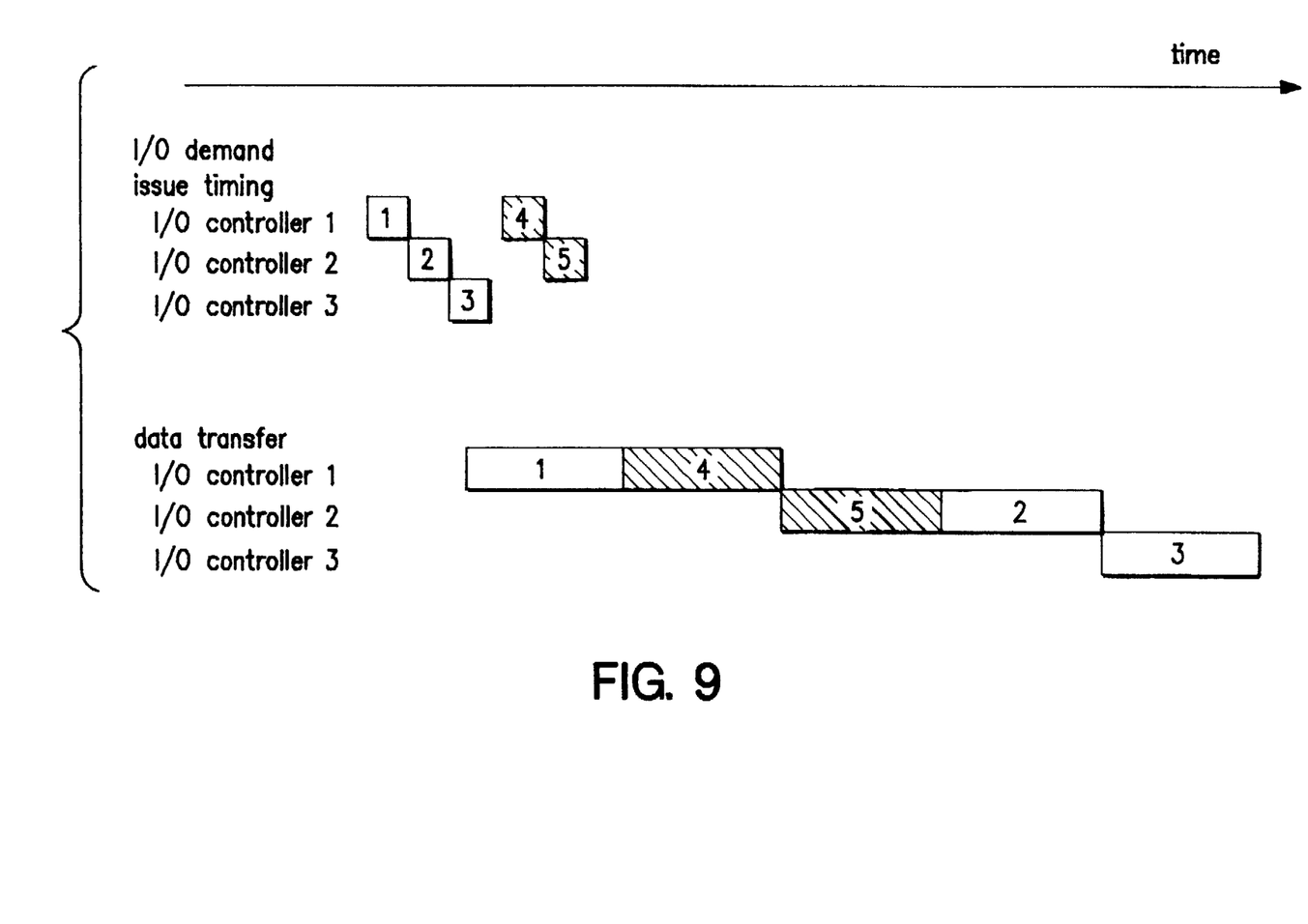
FIG. 9 is a time chart illustrative of data transfer on a disk interface in a third embodiment according to the present invention.

FIG. 9 is a timing chart illustrative of the data transfer on each of the disk interfaces 3, provided that the each disk interface 3 is connected to three disk devices 4 and thus the each disk interface 3 includes the three input-output controllers 1, 2 and 3. In FIG. 9, the input-output demand issuance timing indicates the timing when the input-output demand is issued to the input-output controller 34. The dark demands 4 and 5 have the high priority, while the white color demands 1, 2 and 3 have the low priority. If the demands 4 and 5 are generated where the demands 2 and 3 have not yet been dealt with but the demand 1 has already been dealt with, then the demands 4 and 5 will be dealt with prior to the demands 2 and 3. As a result, it is possible to avoid any interference between the different input-output controllers. This means that it is possible to avoid the interference to the real time operation.

The above configurations provides the following advantages. It is possible to avoid an excess load of the input-output operations to the disk device, thereby resulting in keeping a balance between the processings of the different hardwires. This can facilitate to obtain a constant data transfer rate.

The load to the CPU for controlling the hardware resources is reduced to facilitate a high speed input-output operation. It is possible to conduct the time management by the interface as a hardware without relying upon the software. This facilitates the simultaneous managements of the video data and the audio data.

Whereas modifications of the present invention will be apparent to a person having ordinary skill in the art, to which the invention pertains, it is to be understood that embodiments shown and described by way of illustrations are by no means intended to be considered in a limiting sense. Accordingly, it is to be intended to cover by claims all modifications which fall within the sprite and scope of the invention.

What is claimed is:

1. An input-output interface being connected via an input-output bus to a host computer, said input-output interface being connected via a data bus to at least a memory device, said input-output interface being connected to a reference clock generator, said input-output interface comprising:

a bus interface controller being coupled via said input-output bus to said host computer for receiving an input-output demand;

at least an input-output controller being coupled to said bus interface controller and coupled to said memory device; and an input-output processing rate controller being coupled to said bus interface controller for receiving said input-output demand, said input-output processing rate controller being coupled to said reference clock generator for receiving reference clock informations, said input-output processing rate controller being coupled to said input-output controller, said input-output processing rate controller having a queue management section including:

an input-output demand storing queue for storing an input-output demand;

a priority queue for storing a priority of said input-output demand;

a pending queue for storing a pending input-output demand;

an input-output execution queue for receiving an input-output execution instruction which is effective to said input-output controller, said queue management section having an extending queue which is able to store a time limitation information about until when an input-output operation associated with an input-output demand should be completed and a pending flag indicating whether there is any pending input-output demand stored in said pending queue, wherein said input-output processing rate controller confirms whether there is any demand in said priority queue, if there is any demand in said priority queue then said input-output processing rate controller fetches a demand with the highest priority and subsequently predict with reference to said reference clock information whether it is possible to complete an input-output processing associated with the demand fetched within a time limitation set by a host computer and stored in the extending queue, if it is possible to complete the input-output processing within the time limitation then said input-output processing rate controller issues an input-output processing execution instruction to said input-output controller so that said input-output controller executes the input-output processing associated with said demand with the highest priority, and if it is impossible to complete the input-output processing within the time limitation then said input-output processing rate controller add this demand to said pending queue or cancel this demand, and if there is no demand in said priority queue then said input-output processing rate controller confirms whether there is any demand in said pending queue, if there is any demand in said pending queue then said input-output processing rate controller issues an input-output processing execution instruction to said input-output controller so that said input-output controller executes the input-output processing associated with said pending demand.

2. The input-output interface as claimed in claim 1, wherein said reference clock informations are counter informations to be counted up in clocks maintained by hardware and keeps the necessary data length for managing the data to be controlled and said reference clock signals are transmitted in a bus cycle corresponding to the bus width of the input-output bus.

3. The input-output interface as claimed in claim 1, wherein said reference clock generator issues a bus request signal and when said bus becomes empty then said host computer returns a bus grant signal to said bus interface controller and subsequently said bus interface controller confirms that said bus cycle is the transmission cycle of the reference clock signal when the next bus clock is risen and if it is so then said bus interface controller receives data in the subsequent bus cycle.

4. The input-output interface as claimed in claim 3, wherein during the outputs of the command and data, a statis signal is outputted, which indicates the transmission cycle of the reference clock signal and a frame signal is negated to explicit that the bus cycle is terminated in the clock before the cycle for the final data, and if it is required to feed the bus cycle for feeding the reference data via a bridge to another bus then the time information is fed onto the bus after a time delay in a bridge circuit is compensated.

5. The input-output interface as claimed in claim 1, wherein said interface is connected to a plurality of said memory devices and said interface has the same number of said input-output controllers as said memory devices.

6. The input-output interface as claimed in claim 5, wherein said input-output processing rate controller selects any one of said memory devices with reference to said input-output demand received to confirm the length of the input-output execution queue in the input-output interface connected to the selected memory device, and if the length of the input-output execution queue is beyond a predetermined length of the selected memory device then said input-output demand is added onto said pending queue without executing the input-output processing, and if the length of said input-output execution queue is within the predetermined length of said selected memory device then said input-output processing is performed.

7. The input-output interface as claimed in claim 6, further comprising at least a data buffer being provided between said bus interface controller and said input-output controllers for temporary storing data to be subjected to an input-output processing only when said input-output bus is crowded.

8. An input-output interface being connected via an input-output bus to a host computer, said input-output interface being connected to at least a memory device, said input-output interface being connected to a reference clock generator, said input-output interface comprising:

a bus interface controller being coupled via said input-output bus to said host computer for receiving an input-output demand;

at least an input-output controller being coupled to said bus interface controller and coupled to said memory device;

an input-output processing rate controller comprising a scheduling section and a queue management section, said scheduling section being coupled to said bus interface controller for fetching said input-output demand, said scheduling section being coupled to said reference clock generator for receiving reference clock informations, said queue management section being coupled to said bus interface controller for receiving said input-output demand, said queue management section being coupled to said input-output controller, said queue management section including:

an input-output demand storing queue for storing an input-output demand;

a priority queue for storing a priority of said input-output demand;

a pending queue for storing a pending input-output demand;

an input-output execution queue for receiving an input-output execution instruction which is effective to said input-output controller, said queue management section having an extending queue which is able to store a time limitation information about until when an input-output operation associated with an input-output demand should be completed and a pending flag indicating whether there is any pending input-output demand stored in said pending queue, wherein said scheduling section confirms whether there is any demand in said priority queue, if there is any demand in said priority queue then said scheduling section fetches a demand with the highest priority and subsequently predict with reference to said reference clock information whether it is possible to complete an input-output processing associated with the demand fetched within a time limitation set by a host computer and stored in the extending queue, if it is possible to complete the input-output processing within the time limitation then said scheduling section issues an input-output processing execution instruction to said input-output controller so that said input-output controller executes the input-output processing associated with said demand with the highest priority, and if it is impossible to complete the input-output processing within the time limitation then said queue management section adds this demand to said pending queue or cancel this demand, and if there is no demand in said priority queue then said scheduling section confirms whether there is any demand in said pending queue, if there is any demand in said pending queue then said scheduling section issues an input-output processing execution instruction to said input-output controller so that said input-output controller executes the input-output processing associated with said pending demand.

9. The input-output interface as claimed in claim 8, wherein said reference clock informations are counter informations to be counted up in clocks maintained by hardware and keeps the necessary data length for managing the data to be controlled and said reference clock signals are transmitted in a bus cycle corresponding to the bus width of the input-output bus.

10. The input-output interface as claimed in claim 8, wherein said reference clock generator issues a bus request signal and when said bus becomes empty then said host computer returns a bus grant signal to said bus interface controller and subsequently said bus interface controller confirms that said bus cycle is the transmission cycle of the reference clock signal when the next bus clock is risen and if it is so then said bus interface controller receives data in the subsequent bus cycle.

11. The input-output interface as claimed in claim 10, wherein during the outputs of the command and data, a status signal is outputted, which indicates the transmission cycle of the reference clock signal and a frame signal is negated to explicit that the bus cycle is terminated in the clock before the cycle for the final data, and if it is required to feed the bus cycle for feeding the reference data via a bridge to another bus then the time information is fed onto the bus after a time delay in a bridge circuit is compensated.

12. The input-output interface as claimed in claim 8, wherein said interface is connected to a plurality of said memory devices and said interface has the same number of said input-output controllers as said memory devices.

13. The input-output interface as claimed in claim 12, wherein said input-output processing rate controller selects any one of said memory devices with reference to said input-output demand received to confirm the length of the input-output execution queue in the input-output interface connected to the selected memory device, and if the length of the input-output execution queue is beyond a predetermined length of the selected memory device then said input-output demand is added onto said pending queue without executing the input-output processing, and if the length of said input-output execution queue is within the predetermined length of said selected memory device then said input-output. processing is preformed.

14. The input-output interface as claimed in claim 13, further comprising at least a data buffer being provided between said bus interface controller and said input-output controllers for temporary storing data to be subjected to an input-output processing only when said input-output bus is crowded.

* * * * *